United States Patent
Baer et al.

[11] Patent Number: 5,184,041
[45] Date of Patent: Feb. 2, 1993

[54] STRUCTURE FOR COUPLING FIELD WINDINGS TO MOTOR BRUSHES

[75] Inventors: Mark Baer, Linden; R. Lent Crevling, Jr., Williamsport, both of Pa.

[73] Assignee: Shop Vac Corporation, Williamsport, Pa.

[21] Appl. No.: 667,977

[22] Filed: Mar. 12, 1991

[51] Int. Cl.⁵ .......................................... H02K 13/00
[52] U.S. Cl. .................................. 310/239; 310/43; 310/71; 310/89; 310/179
[58] Field of Search ................ 310/71, 42, 179, 43, 310/180, 261, 89, 157, 254, 239, 240, 245, 248

[56] References Cited

U.S. PATENT DOCUMENTS

| | | | |
|---|---|---|---|
| 3,955,113 | 5/1976 | Hillyer | 310/239 |
| 3,979,615 | 9/1976 | Neff | 310/71 |
| 4,056,749 | 11/1977 | Carlson | 310/239 |
| 4,613,781 | 9/1986 | Sanders | 310/239 |
| 4,677,329 | 6/1987 | Secoura | 310/71 |
| 4,746,828 | 5/1988 | Nado | 310/71 |
| 4,800,312 | 1/1989 | Wacek | 310/42 |
| 4,845,395 | 7/1989 | Huber | 310/239 |
| 4,851,730 | 7/1989 | Fushiya | 310/249 |
| 4,963,779 | 10/1990 | Lentino | 310/71 |
| 4,972,113 | 11/1990 | Newberg | 310/89 |

Primary Examiner—R. Skudy
Attorney, Agent, or Firm—Ostrolenk, Faber, Gerb & Soffen

[57] ABSTRACT

An improved structure for coupling field windings to motor brushes, including a nonconductive brush housing, a conductive brush holder located in the brush housing, a wire guide for guiding the field winding to the tab, the brush holder including a conductive tab extending outside the brush housing and means for electrically coupling the field winding to the tab. The brush holder holds the brush for movement along a predetermined axis. The wire guide guides the field winding to the tab along a predetermined axis which includes a portion extending generally parallel to the predetermined axis.

19 Claims, 6 Drawing Sheets

FIG. 11

STRUCTURE FOR COUPLING FIELD WINDINGS TO MOTOR BRUSHES

BACKGROUND OF THE INVENTION

The present invention is directed towards an improved structure for coupling field windings to motor brushes.

Vacuum cleaners, hand-held power tools and other small electrically powered devices are often provided with motors having wound rotors that are energized through circuits which include carbon brushes which engage a commutator mounted on the rotor. In the standard construction, field windings which extend around the stator must be coupled to the carbon brushes. U.S. Pat. No. 4,800,312 describes an improved structure for automatically coupling the field windings to respective brushes.

In accordance with this patent, brush tube receptacles which house the brushes are formed with a V-shaped groove extending laterally from the brush tubes. As the brush tube receptacle is pushed into its plastic housing, the V-shaped groove snares and frictionally catches the field winding. While this simplifies the procedure for coupling the field winding to the brush tube, and represents a significant improvement over the prior art, the design sometimes proved unreliable due to the mechanical nature of the connection.

SUMMARY OF THE INVENTION

In accordance with the present invention, the motor includes a generally cylindrical stator comprising a magnetic core having a generally cylindrical opening formed therein and first and second stator windings coupled to the magnetic core to generate a magnetic flux in the generally cylindrical opening when current passes through the stator windings. A wound rotor is located within the generally cylindrical opening and includes an armature, a shaft defining the rotational axis for the rotor and a commutator electrically connected to the armature. Means, preferably in the form of upper and lower housings coupled to the stator, are provided for supporting the shaft for rotation about the rotational axis. A pair of brush assemblies are provided. Each of the brush assemblies includes a brush; an insulated brush housing; a conductive brush holder for supporting the brush for movement along a second axis which permits the brush to be biased into contact with the commutator, the brush holder including a conductive tab extending outside of the brush housing at a location radially outward of the generally cylindrical stator; means for biasing the brush radially inward relative to the cylindrical opening and into contact with the commutator; a wire guide for guiding a respective brush end of the stator winding to the tab; and means for coupling the respective brush end of the stator winding to the tab.

In the preferred embodiment, the brush end of the stator winding extends through an opening in the upper housing before it is guided to the tab by the wire guide. The wire guide defines a channel having a predetermined width which is slightly larger than the width of the stator winding. The wire guide is preferably located adjacent the brush housing and is formed integrally therewith. The wire guide preferably defines a U-shaped channel, one of the walls of the channel being defined by the brush housing. One of the walls of the U-shaped channel preferably diverges openwardly so as to guide the brush end of the field winding into the U-shaped channel.

Other features and advantages of the present invention will become apparent from the following description of the invention which refers to the accompanying drawings.

BRIEF DESCRIPTION OF THE DRAWINGS

For the purpose of illustrating the invention, there is shown in the drawings a form which is presently preferred; it being understood, however, that the invention is not limited to the precise arrangements and instrumentalities shown.

DETAILED DESCRIPTION OF THE PREFERRED EMBODIMENT

Figure 1:
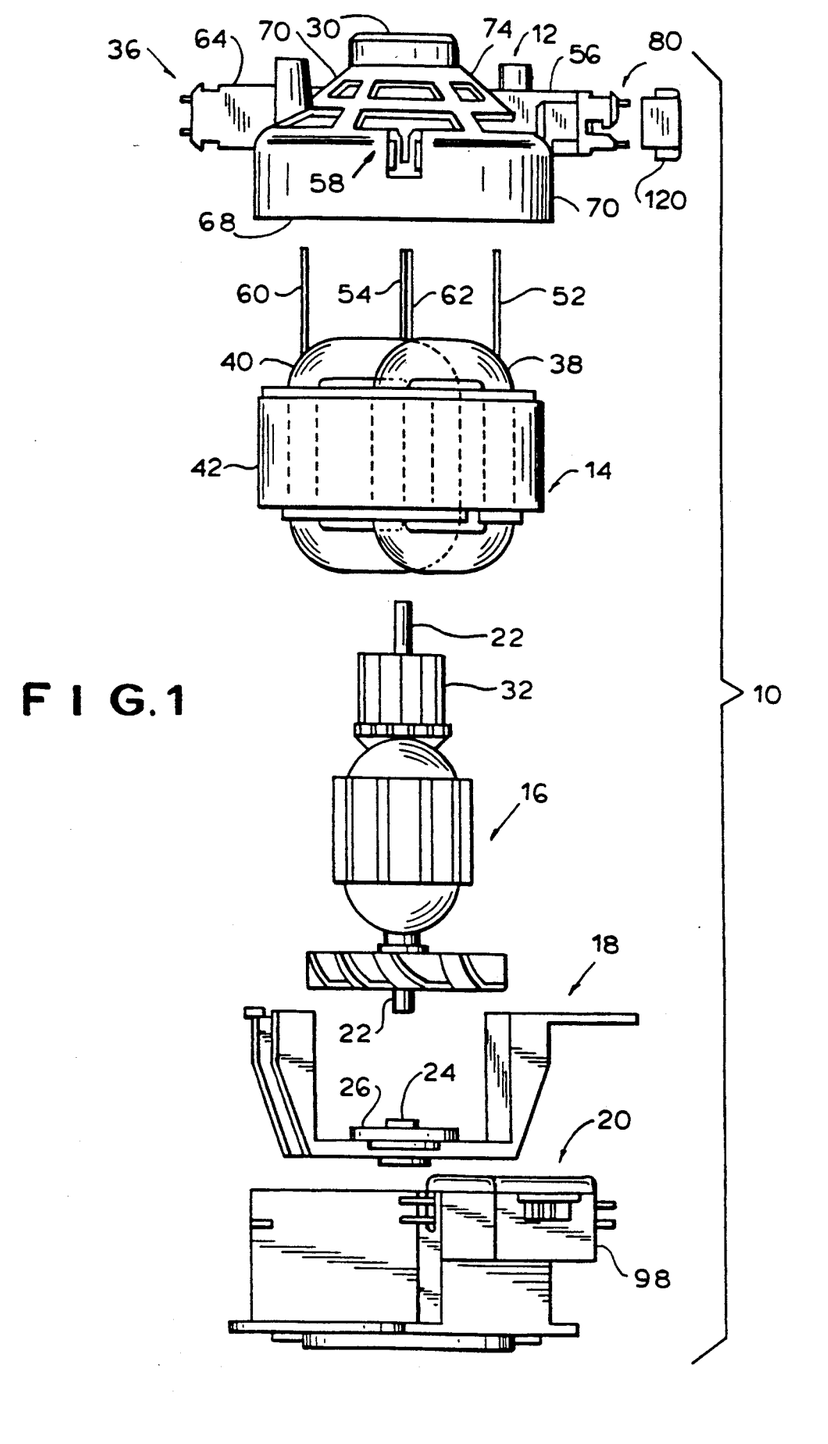
FIG. 1 is an exploded view of a motor constructed in accordance with the principles of the present invention.
Figure 11:
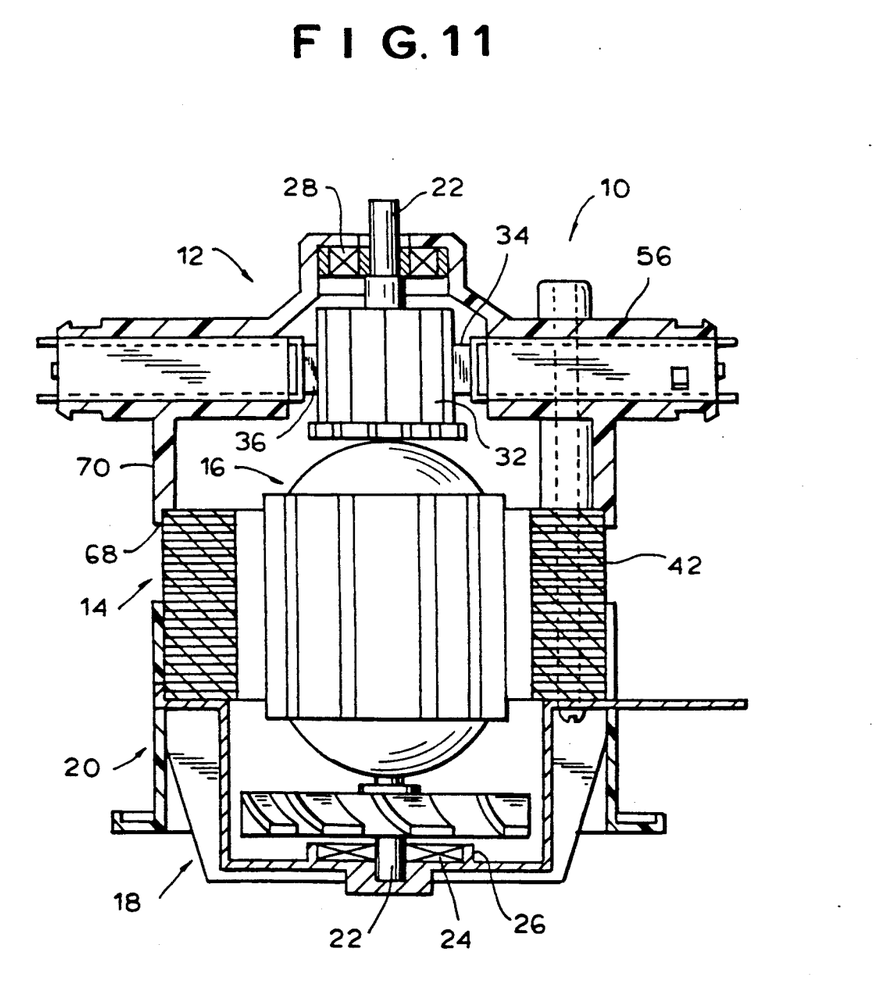
FIG. 11 is a cross-sectional view of the motor of FIG. 1 (not in exploded form).

Referring now to the drawings wherein like numerals indicate like elements, there is shown in FIG. 1 an exploded view of a motor constructed in accordance with the principles of the present invention and designated generally as 10. Motor 10 includes an upper housing 12, a stator assembly 14, a rotor assembly 16, a spider 18 and a lower housing 20. As best seen in FIG. 11, the rotor assembly 16 includes a rotor shaft 22 which is journaled between a lower bearing 24 located in the cylindrical housing 26 located in spider 18 and an upper bearing 28 located in cylindrical housing 30 formed in upper housing 12. The rotor assembly 16 formed on the rotor shaft 22 is stationed internally of the stator core 42 and rotates internally of the stator core 42. A commutator 32 is located on rotor shaft 22 of the rotor assembly 16 and is contacted by respective carbon brushes 34, 36 located on opposite sides of commutator 32.

Figure 4:
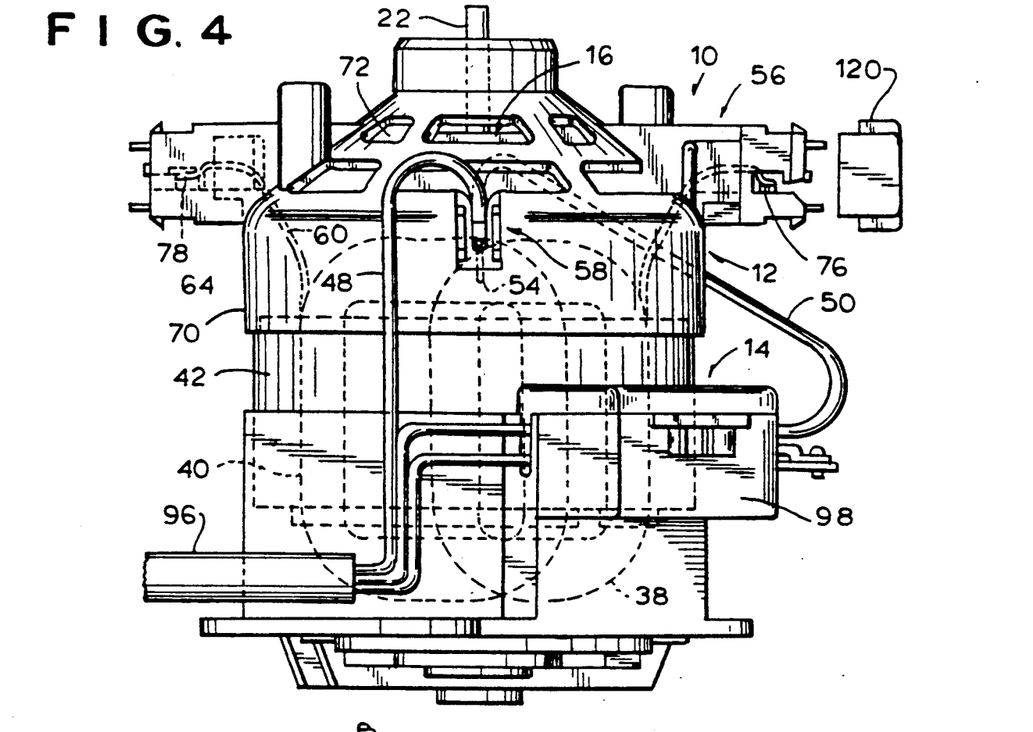
FIG. 4 is a side view of the motor of FIG. 1 (not in exploded form) showing the external lead connections.

As best shown in FIG. 1, the stator assembly 14 includes a pair of field windings 38, 40 which are wound on a stator core 42. One end of each of the field windings must be coupled to a respective carbon brush 34, 36 and the other end of each of the field windings 38, 40 must be coupled to a respective power line 48, 50 (FIG. 4).

To save costs, it is highly preferable that the motor of the present invention be assembled utilizing automatic machine equipment. The process for coupling the opposite ends of the field windings 38, 40 to the brushes 34, 36 and the power lines 48, 50 must therefor be as simple and automated as possible and be tolerant to small misalignments in the various parts of the motor during the assembly process.

Figure 2:
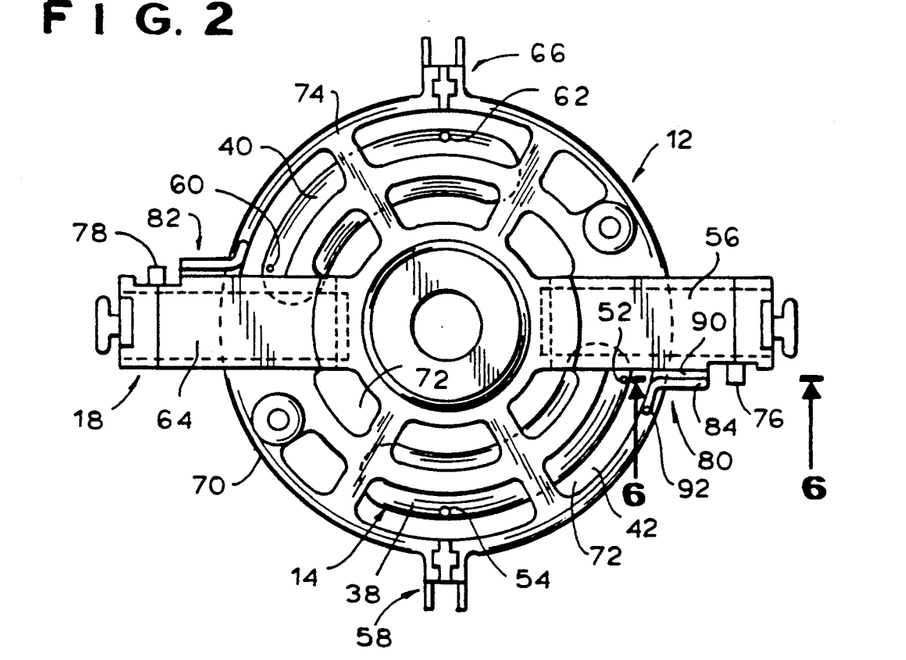
FIG. 2 is a top view of the upper housing of the motor of FIG. 1 (not in exploded form).
Figure 3:
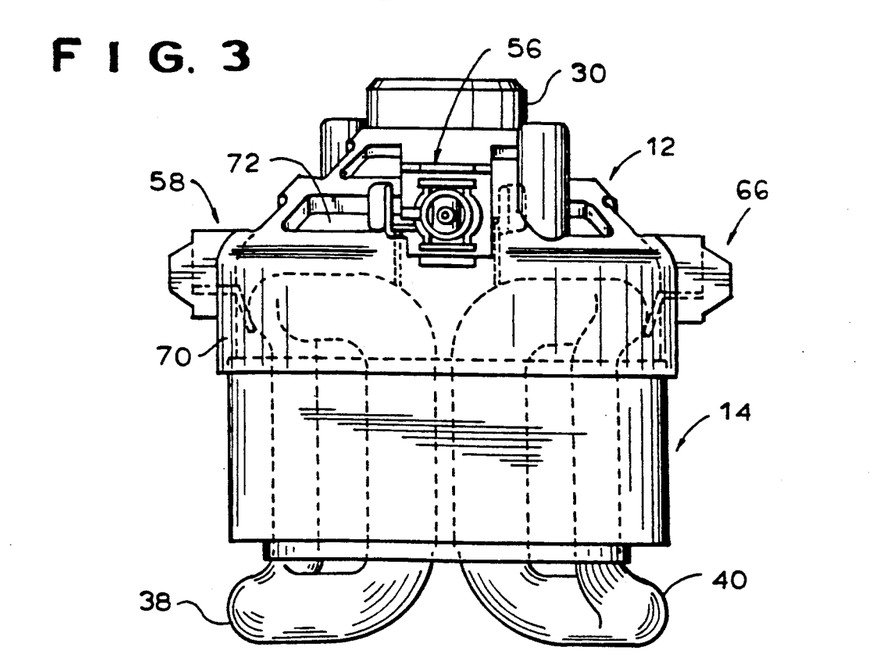
FIG. 3 is a side view of the motor of FIG. 1 (not in exploded form) with the rotor assembly and lower housing removed

Referring to FIGS. 1 and 2, the manner in which the opposite ends of field windings 38, 40 are coupled to the carbon brushes 34, 36 and power lines 48, 50 will now be described.

The opposite ends (referred to hereinafter as brush lead 52 and power end 54, respectively) of field winding 38 are initially oriented to extend vertically upward at a location adjacent the brush housing 56 and the terminal assembly housing 58, respectively. Similarly, the opposite ends (referred to hereinafter as brush 60 and power end 62) of field winding 40 are oriented in the vertically upward direction and are located adjacent brush housing 64 and terminal assembly housing 66, respectively.

In the automated process, the stator assembly 14 and the upper housing 12 are initially brought into axial alignment with the upper housing 12 being located above the ends leads and of field windings 38, 40. The upper housing 12 is initially located above the position illustrated in FIG. 1. The rotational alignment of the upper housing 12 and stator assembly 14 are as shown in FIGS. 1 and 2. Once this alignment has been completed, the upper housing 12 is moved downwardly in an axial direction until the bottom edge 68 of the skirt 70 forming the lower portion of upper housing 12 slightly overlaps the top laminations of the stator core 62. The outer radius of ht stator core 42 is substantially equal to the inner radius of the cylindrical skirts 70 of the upper housing 12 to provide a close fit. Large openings 72 (FIG. 2) are formed int eh cone-shaped dome 74 of the upper housing 12. These openings serve two purposes: they permit cooling air to flow through the filed windings 38, 40 and they also permit the leads and ends of field windings 38, 40 to extend easily through the openings 72 of dome 74 during the assembly process. The large size of the openings facilitates the assembly process since it provides a large tolerance for misalignments between the leads and ends of the field windings 38, 40 when the upper housing 12 is being placed over the stator assembly 14.

Once the upper housing 12 has been placed over the stator assembly 14 (FIG. 5), the brush end 52 of field winding 38 will be aligned with the bottom most edge of brush housing 56, the power end 54 (as viewed in FIG. 2) of the field winding 38 will be aligned with the terminal assembly housing 58, the brush lead 60 of the field winding 40 will be aligned with the upper edge of the brush housing 64 and the power end 62 of the field winding 40 will be aligned with the terminal assembly housing 66.

The next step in the assembly process is to bend the brush leads 52, 60 of field windings 38, 40 into a generally horizontal orientation (as viewed in FIG. 1) so that they come into contact with tabs 76, 78 forming part of the brush holder assemblies. The manner in which the tab 76, 78 are integrated with the brush holder assemblies will be described below. It is sufficient at this time to note that the tabs are both formed of conductive materials and form part of the electrical connection between the respective field windings 38, 40 and the carbon brushes 34, 36. To complete this connection, the brush leads 52, 60 of the windings 38, 40 must be electrically and physically coupled to the tabs 76, 78, respectively.

To facilitate in the coupling process, a pair of wire guides 80, 82 (FIG. 2) are formed adjacent one side of the brush housings 56, 64, respectively. The structure of the wire guides 80, 82 are identical. Only the structure of wire guide 80 will be described in detail.

Figure 5:
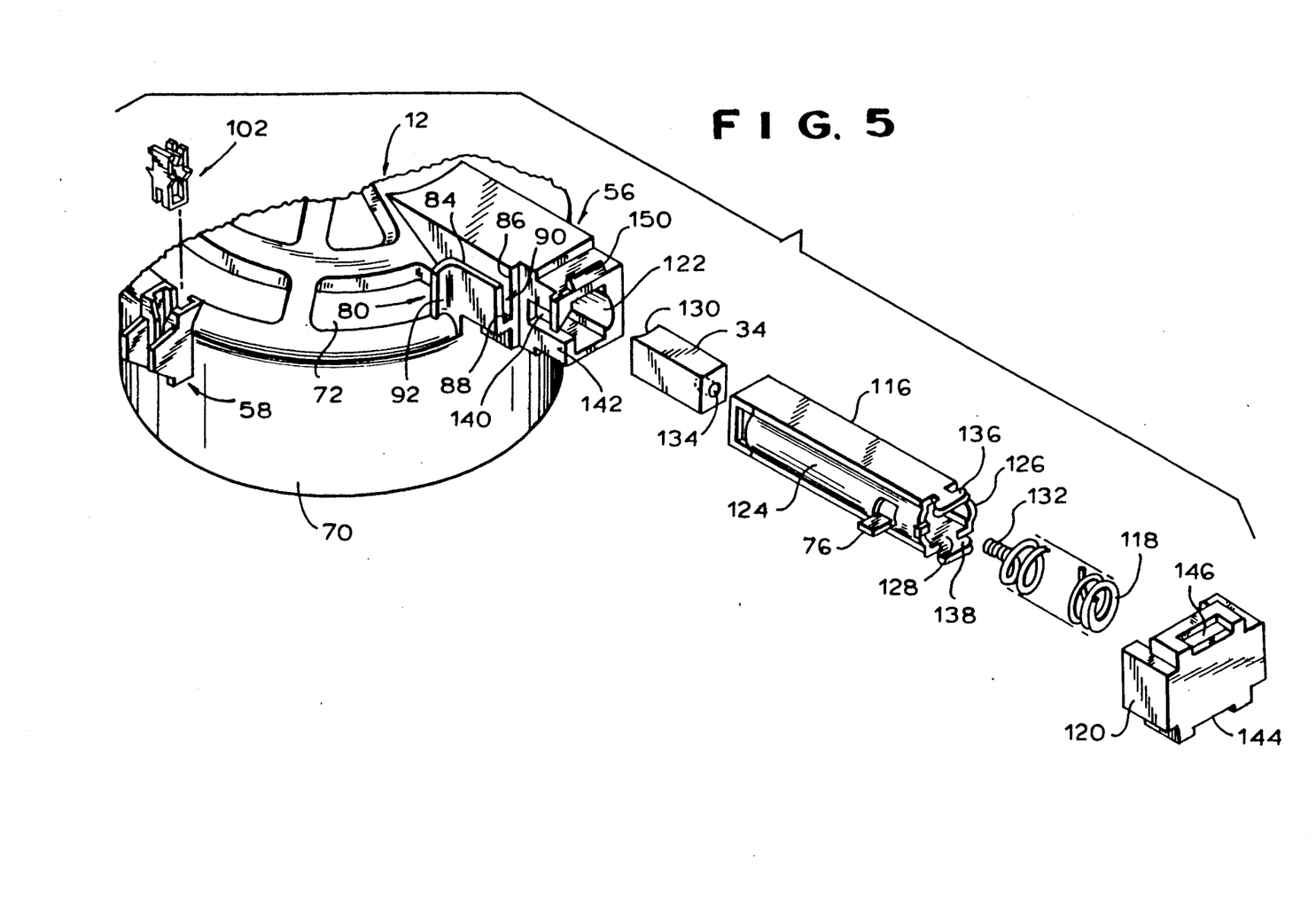
FIG. 5 is an exploded detail view of the brush holder assembly of the motor of FIG. 1.
Figure 7:
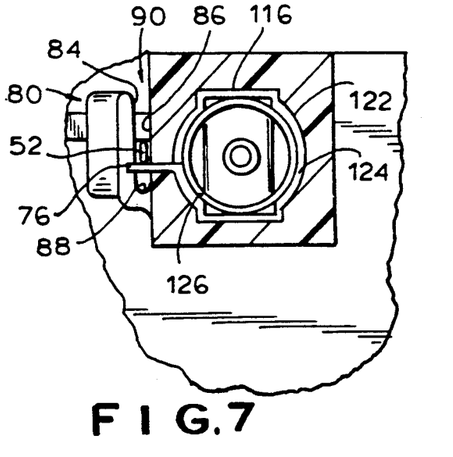
FIG. 7 is a sectional view taken along lines 7—7 of FIG. 6.

As best shown in FIGS. 5 and 7, the wire guide 80 includes a left lateral wall 84, a right lateral wall 86 and a bottom wall 88 together defining a U-shaped channel 90. In the preferred embodiment, the wire guide 80 is formed integrally with the brush housing 56 which, in turn, is formed integrally with the upper housing 12. More particularly, these elements are preferably formed in a single molding operation out of an appropriate plastic material. The width of the U-shaped channel 90 is preferably slightly greater than the diameter of the brush lead 52 of the field winding 38. The width of the opening 72 formed in the upper housing 12 is preferably many times wider than the width of the U-shaped channel 90.

Figure 9:
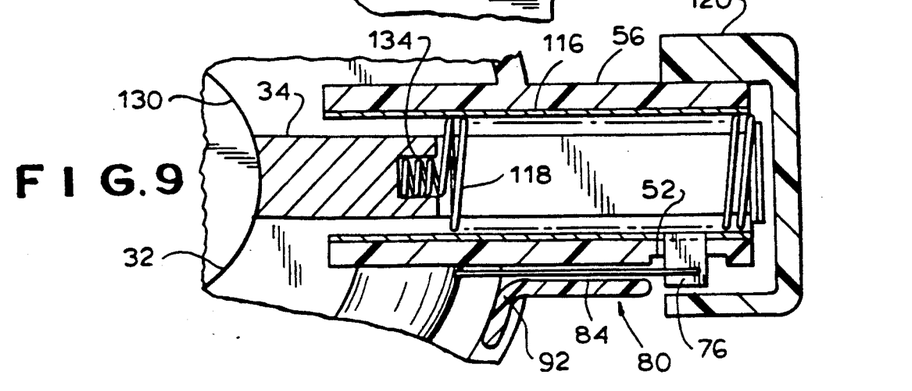
FIG. 9 is a cross-sectional view taken along lines 9—9 of FIG. 8.

As best shown in FIG. 9, the front end of lateral wall 84 preferably has a curved radius 92 which provides a wide opening into which the brush lead 52 of field winding 38 may be placed.

Referring to FIG. 2, the brush end 52 of field winding 38 is normally aligned with the U-shaped channel 90 of the wire guide 80. If the brush lead 52 is slightly misaligned (e.g., is below the position illustrated in FIG. 2), the brush lead 52 will contact the front face of the curved surface 92 and will be guided into the U-shaped channel 90. This will ensure that the brush lead 52 will align with and extend over the tab 76 when it is bent into the horizontal position.

Figure 6:
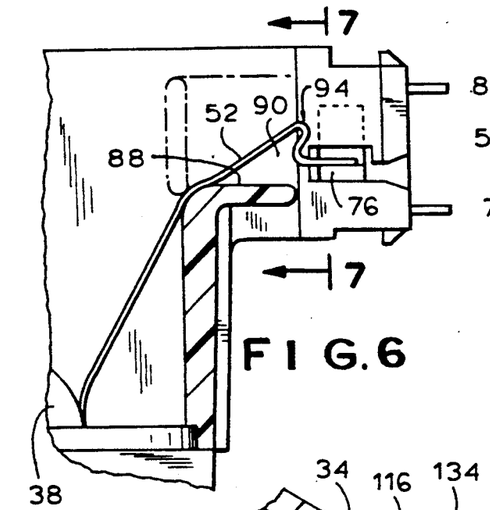
FIG. 6 is a partial sectional view taken along lines 6—6 of FIG. 2.

Referring to FIG. 6, the brush lead 52 extends from the main portion of the field winding 38 up into the U-shaped channel 90 and is then coupled to the tab 76. A reverse S-shaped bend 94 is formed in the brush lead 52 of the field winding 38 at a location between the tab 76 and the main body of the field winding 38. This reversed S-shaped end is preferably made by an automatic crimping machine.

Figure 8:
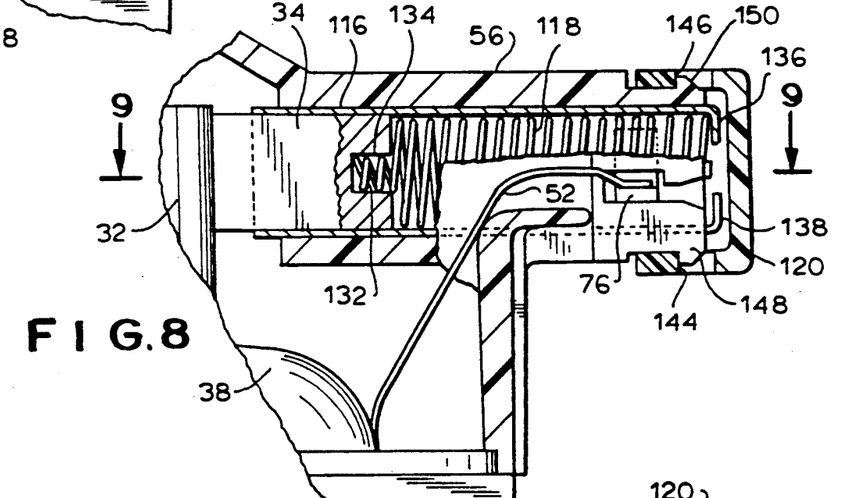
FIG. 8 is a sectional view, similar to FIG. 6, but also showing the brush holder assembly in, partially in section.

The distal end of the brush lead 52 is mechanically and electrically coupled to the tab 76, preferably by an automatic sonic welding process. It has been found necessary to form the reversed S-shaped bend 94 in the brush lead 52 to provide additional slack which allows reciprocating, linear motion during the welding process. In FIG. 6, the brush lead 52 has not yet been sonically welded to tab 76. In FIG. 8, the brush lead 52 has been sonically welded to the tab 76 and the reversed S-shaped bend 94 has absorbed the vibratory forces imposed on the brush lead 52 during the welding operation.

The manner in which the power ends 54, 62 of field winding 38, 40, respectively are coupled to the terminal assembly housings 58, 66 will now be described.

Referring to the Figures, the motor 10 is connected to a three lead power cord 96 through an on/off switch 98. A first power line 48 is coupled to the power end 54 of field winding 38 at the terminal assembly housing 58. While not fully shown in the Figure, the second power line 50 is coupled to the power end 62 (see FIG. 2) of field winding 40 at the terminal assembly housing 66. The connections at the terminal assembly housing 58, 66 are identical. Accordingly, only the connection at terminal assembly housing 58 will be described.

Figure 10:
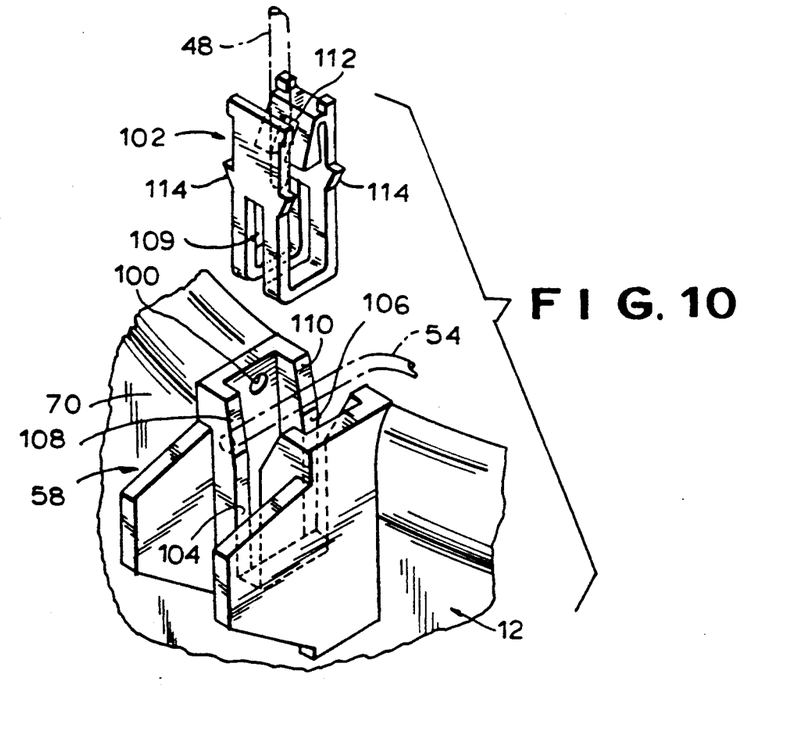
FIG. 10 is an enlarged prospective, exploded view illustrating the cooperation between the terminal assembly housing and its associated terminal clip.

As best shown in FIG. 10, terminal assembly housing 58 is preferably integrally molded with the upper housing 12 and includes a rectangular parallelepiped chamber 100 which receives the power end 54 of field winding 38, the power lien 48 and a clip-type terminal 102. A pair of axially extending slots 104, 106 are formed in the radially inward and radially outward walls of chamber 100 and receive power end 54. More particularly, the power end 54 is preferably automatically bent from its vertically oriented position illustrated in FIG. 1 to a horizontally oriented position where it extends through the two slots 104, 106 in chamber 100. V-shaped entrance openings 108, 110 are formed at the upper end of slots 104, 106, respectively, to guide the power end 54 into the slots as the power end is bent into the horizontal position.

After the power end 54 has been placed in the bottom of slots 104, 106, the terminal 102 is then forced downwardly into the chamber 100 so that the power end 52 is inserted into the slot 104. When the terminal 102 is forced into the chamber 100, the power end 54 is caught with slot 109 of terminal 102. The distal end of the power line 48, which has been stripped of its insulating sheathing, is then inserted into the notch 112 formed in the terminal 102. The terminal 102 is locked in place in the chamber 100 by triangular-shaped projections 114 and maintain a strong mechanical and electrical connections between the power line 48 and the power end 54.

The brush assembly will now be described with reference to FIGS. 5 through 8. Since the brush assemblies for brush 34 and brush 36 are identical, the assembly for brush 34 only will be described.

The brush assembly includes the brush housing 56, the carbon brush 34, a metallic brush holder 116, a compression spring 118 and an end cap 120. As best viewed in FIGS. 5 and 7, the metallic brush holder 116 has a generally rectangular parallelepiped configuration except that its lateral walls 124, 126 are formed with a partially circular shape. The dimensions of the generally rectangular opening 128 in brush holder 116 corresponds to the size and shape of the rectangular cross section of carbon brush 34 so that the carbon brush fits closely within the rectangular opening 128. The cross-sectional dimensions of the carbon brush 34 are slightly smaller than that of the opening 128 so that the brush can move freely within the opening.

The compression spring 118 is inserted into the opening 128 in brush holder 116 to force the forward end 130 of the brush 34 against the commutator 32 as best shown in FIGS. 8 and 9. The generally circular shape of the lateral walls 124, 126 is provided to snugly accommodate the outer radius of spring 118. The forwardmost end 132 of spring 118 is formed in the shape of a reduced diameter spiral. This reduced diameter forwardmost end 132 is received within a corresponding cylindrical opening 134 formed in the back end of carbon brush 34.

The outer diameter of the forwardmost end 132 of spring 118 is slightly greater than the inner diameter of the cylindrical opening 134 so that the end 132 of spring 118 can be effectively screwed into the opening 134. This forms a tight frictional fit which permits the spring 118 and the brush 34 to be removed from the brush holder 116 as a unit when the brush 34 must be replaced.

Tabs 136, 138 are formed at the rear end of metallic brush holder 116 and may be bent into the closed position illustrated in FIG. 8 to hold the spring 118 in the metallic brush holder 116. In this way, the compression spring 118 constantly biases the carbon brush 34 against the commutator 32. As the front edge of the brush 34 is worn away due to frictional contact with the commutator 32, the spring 118 will expand constantly pressing a new front surface of the brush 34 against the commutator 32. When the brush is completed worn, the tabs 136, 138 are opened and the spring 118, and with it the remaining portion of the brush 36, are removed from the holder 116 and a new brush is inserted into the holder.

As best shown in FIGS. 5 and 7, the size and profile of the opening 122 formed in the brush housing 56 closely corresponds to the outer size and profile of the metallic brush holder 116 to ensure that the metallic brush holder 116 is tightly held within the opening 122 in a friction fit. In normal use, the metallic brush holder 116 will remain within the opening 122 formed in brush housing 56 throughout the life of the motor 10. When the brush 36 must be replaced, only the spring 118, and with it the brush 34, are removed from the brush housing 56. When necessary, the brush holder 116 can be forcibly removed from the opening 122 utilizing a pliers or other suitable tool.

As best shown in FIG. 5, a lateral slot 140 is formed in the left wall 142 of brush housing 56. The slot receives the tab 76 when the metallic brush holder 116 is inserted into the opening 122 and brush housing 56. The tab is preferably formed integrally with the brush holder 116 by punching out the lateral wall 124 of the brush holder 116 Since the brush holder 116 is formed of a metallic material, it will form an electrical connection between the lead 52 and the brush 34 once the power end 54 of field winding 38 has been welded or otherwise electrically coupled connected to the tab 76.

In the preferred embodiment, a plastic end cap 120 is removably coupled to the brush housing 56 through the interaction of recesses 144, 146 formed in the end cap 120 and corresponding projections 148, 150 (see FIG. 8) formed on the brush housing 56. This forms a snap-fit relationship which permits the user to snap the end cap 120 onto the brush housing 56 and remove the end cap 120 from the housing 56 when desired.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. In a motor, the combination comprising
a nonconductive brush housing;
a conductive brush holder located in said brush housing, said brush holder for holding a brush for movement along a predetermined axis, said brush holder including a conductive tab extending outside of said brush housing;
a wire guide is located adjacent said brush housing for guiding a field winding to said tab along a predetermined path which includes a portion extending generally parallel to said predetermined axis;
means for electrically coupling said field winding to said tab.

2. In a motor, the combination of claim 1, wherein said wire guide is formed integrally with said brush housing.

3. In a motor, the combination of claim 2, wherein said wire guide defines a generally U-shaped channel.

4. In a motor, the combination of claim 3, wherein one wall of said U-shaped channel is defined by said brush housing.

5. In a motor, the combination of claim 4, wherein said U-shaped channel has a diverging opened end for guiding said field winding into said U-shaped channel.

6. In a motor, the combination of claim 5, wherein said diverging opened end is defined by a curved wall.

7. In a motor, the combination of claim 1, wherein said tab is located radially outward of a generally cylindrical stator forming part of said motor.

8. In a motor, the combination of claim 7, wherein said motor includes an upper housing coupled to said generally cylindrical stator and wherein said field winding extends through an opening in said housing before it extends into said wire guide.

9. In a motor, the combination of claim 8, wherein said nonconductive brush housing is formed integrally with said upper housing.

10. A motor comprising:
   (a) a generally cylindrical stator including a magnetic core means having a generally cylindrical opening formed therein and first and second stator windings coupled to said magnetic core means to generate a magnetic flux in said generally cylindrical opening when current passes through said stator windings;
   (b) a wound rotor located within said generally cylindrical opening and including an armature, a shaft defining a rotational axis for said rotor and a commutator electrically connected to said armature;
   (c) means for supporting said shaft for rotation about said rotational axis;
   (d) a pair of brush assemblies, each of said brush assemblies comprising;
   1) a brush;
   2) an insulated brush housing;
   3) a conductive brush holder for supporting said brush for movement along a second axis which permits said bush to be biased into contact with said commutator, said brush holder including a conductive tab extending outside of said brush housing at a location radially outward of said generally cylindrical stator;
   4) means for biasing said brush radially inward relative to said cylindrical opening and into contact with said commutator;
   5) a wire guide is located adjacent said brush housing for guiding an end of said stator windings to said tab; and
   6) means for coupling said end of said stator windings to said tab.

11. A motor according to claim 10, wherein said means for supporting said shaft includes an upper housing coupled to said stator and wherein said respective brush end of stator winding extends through an opening in said upper housing before being guided to said tab by said wire guide.

12. A motor according to claim 11, wherein said wire guide defines a channel having a predetermined width and wherein a width of said opening in said upper housing is substantially larger than said width of said channel.

13. A motor according to claim 10, wherein said wire guide is formed integrally with said brush housing.

14. A motor according to claim 13, wherein said wire guide defines a generally U-shaped channel through which said end of said stator windings extend.

15. A motor according to claim 14, wherein one wall of said U-shaped channel is defined by said brush housing.

16. A motor according to claim 15, wherein said U-shaped channel has a diverging opened end for guiding said respective brush end of said stator winding into said U-shaped channel.

17. A motor according to claim 16, wherein said diverging open end is defined by a curved wall of said U-shaped channel.

18. A motor according to claim 17, wherein said means for supporting said shaft for rotation about said rotational axis comprises an upper housing coupled to said generally cylindrical stator and wherein said brush housing and said wire guide is integrally formed with said upper housing.

19. A motor according to claim 10, wherein said wire guide guides said end of said stator windings along a predetermined path which includes a portion extending parallel to said second axis.

* * * * *